(12) United States Patent
Kimoto et al.

(10) Patent No.: US 8,574,116 B2
(45) Date of Patent: Nov. 5, 2013

(54) COMPRESSOR WITH TRANSMISSION

(75) Inventors: Yoshio Kimoto, Aichi-ken (JP); Masaki Ota, Aichi-ken (JP); Masahiro Kawaguchi, Aichi-ken (JP); Nobuaki Hoshino, Aichi-ken (JP); Toru Onishi, Aichi-ken (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 300 days.

(21) Appl. No.: 13/071,684

(22) Filed: Mar. 25, 2011

(65) Prior Publication Data

US 2011/0243766 A1 Oct. 6, 2011

(30) Foreign Application Priority Data

Mar. 31, 2010 (JP) ................................. 2010-080323

(51) Int. Cl.
*F16H 3/44* (2006.01)
(52) U.S. Cl.
USPC .......................................... 475/318; 475/183
(58) Field of Classification Search
USPC ............. 475/86, 89, 114, 116, 127, 165, 269, 475/317, 318, 5, 149, 150, 183, 320, 331, 475/346, 347; 180/53.8; 62/508, 498
See application file for complete search history.

(56) References Cited

U.S. PATENT DOCUMENTS

| | | | |
|---|---|---|---|
| 4,870,875 A * | 10/1989 | Morishita ...................... | 475/153 |
| 6,609,992 B2 * | 8/2003 | Kusumoto et al. ............ | 475/318 |
| 7,273,436 B2 * | 9/2007 | Hiroyuki et al. .............. | 475/183 |
| 7,841,845 B2 * | 11/2010 | Ignatiev ....................... | 418/55.1 |
| 2005/0233854 A1 * | 10/2005 | Ota et al. ...................... | 475/186 |
| 2005/0271534 A1 * | 12/2005 | Yokoyama .................... | 418/55.6 |
| 2009/0321214 A1 * | 12/2009 | Hoshino et al. .............. | 192/84.961 |
| 2011/0245004 A1 * | 10/2011 | Hoshino et al. .............. | 475/114 |
| 2012/0251347 A1 * | 10/2012 | Kimoto et al. ................ | 417/319 |

FOREIGN PATENT DOCUMENTS

JP 2007-107412 4/2007

OTHER PUBLICATIONS

U.S. Appl. No. 13/049,107 to Nobuaki Hoshino et al., filed Mar. 16, 2011.

* cited by examiner

*Primary Examiner* — Justin Holmes
(74) *Attorney, Agent, or Firm* — Greenblum & Bernstein, P.L.C.

(57) ABSTRACT

A compressor includes a housing, a compression mechanism, an input shaft rotatable on an axis thereof, an output shaft for driving the compression mechanism, a transmission for transmitting torque from the input shaft to the output shaft and also changing the rotating speed of the input shaft and a control device for controlling the operation of the transmission. The transmission includes a plurality of planetary rollers, a carrier rotatably supporting the respective planetary rollers and being integrally rotatable with the input shaft, a sun roller engaged with the respective planetary rollers and integrally rotatable with the output shaft and a ring roller engaged with the respective planetary rollers. The ring roller can be fixed to the housing or rotatable relative to the housing. The control device includes a one-way clutch allowing the ring roller to rotate only one direction relative to the carrier and a clutch fixing the ring roller to the housing or allowing the ring roller to rotate relative to the housing. The input shaft, the carrier, the respective planetary rollers and the sun roller cooperate to form an assembly that can move as a unit relative to the housing in the direction that is parallel to the axis.

14 Claims, 5 Drawing Sheets

COMPRESSOR WITH TRANSMISSION

BACKGROUND OF THE INVENTION

The present invention relates to a compressor with a transmission.

Japanese Patent Application Publication 2007-107412 discloses a compressor including a housing, a compression mechanism formed in the housing and operable to compress refrigerant, an input shaft extending into the housing from outside and rotatably supported, an output shaft extending in the housing and rotatably supported for driving the compression mechanism, a transmission provided in the housing between the input shaft and the output shaft for transmitting torque from the input shaft to the output shaft and also changing the rotating speed of the output shaft for driving the compression mechanism by increasing or decreasing the rotating speed of the input shaft, and a control device for controlling the operation of the transmission.

The transmission includes a first planetary gear train and a second planetary gear train provided in the front (on the input shaft side) and in the rear (on the output shaft side) in the axial direction thereof, respectively. Each of the first and the second planetary gear trains include a sun gear, a plurality of planetary gears, a carrier retaining respective rotatable planetary gears and a ring gear engaged with respective planetary gears. A thrust bearing and a radial bearing are provided between the respective ring gears and the housing. The ring gear is selectively fixed to or rotatable relative to the housing.

The control device includes a first one-way clutch provided between the ring gear of the first planetary gear train and the housing, a first clutch provided between the ring gear of the first planetary gear train and the carrier, a second one-way clutch provided between the ring gear of the second planetary gear train and the carrier, and a second clutch provided between the ring gear of the second planetary gear train and the housing. The first and the second clutches are operable to engage the respective ring gears selectively with the carrier or with the housing by being displaced in longitudinal direction of the compressor.

The first and the second clutches of the above compressor selectively engage or disengage the respective ring gears independently or simultaneously thereby to allow or prevent the rotation of the respective ring gears relative to the housing or the carrier. Thus, the transmission can change the gear ratio and drive the compression mechanism, accordingly.

However, the structure of the above-described compressor is complicated and, therefore, there has been problems of high manufacturing cost and large noise development due to vibration.

The present invention is directed to providing a compressor with a transmission that can be manufactured at low cost and accomplishes noise reduction.

SUMMARY OF THE INVENTION

A compressor includes a housing, a compression mechanism, an input shaft rotatable on an axis thereof, an output shaft for driving the compression mechanism, a transmission for transmitting torque from the input shaft to the output shaft and also changing the rotating speed of the input shaft and a control device for controlling the operation of the transmission. The transmission includes a plurality of planetary rollers, a carrier rotatably supporting the respective planetary rollers and being integrally rotatable with the input shaft, a sun roller engaged with the respective planetary rollers and integrally rotatable with the output shaft and a ring roller engaged with the respective planetary rollers. The ring roller can be fixed to the housing or rotatable relative to the housing. The control device includes a one-way clutch allowing the ring roller to rotate only one direction relative to the carrier and a clutch fixing the ring roller to the housing or allowing the ring roller to rotate relative to the housing. The input shaft, the carrier, the respective planetary rollers and the sun roller cooperate to form an assembly that can move as a unit relative to the housing in the direction that is parallel to the axis.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

The following will describe the compressor with the transmission according to the first through the third embodiments with reference to the accompanying drawings.

Figure 1:
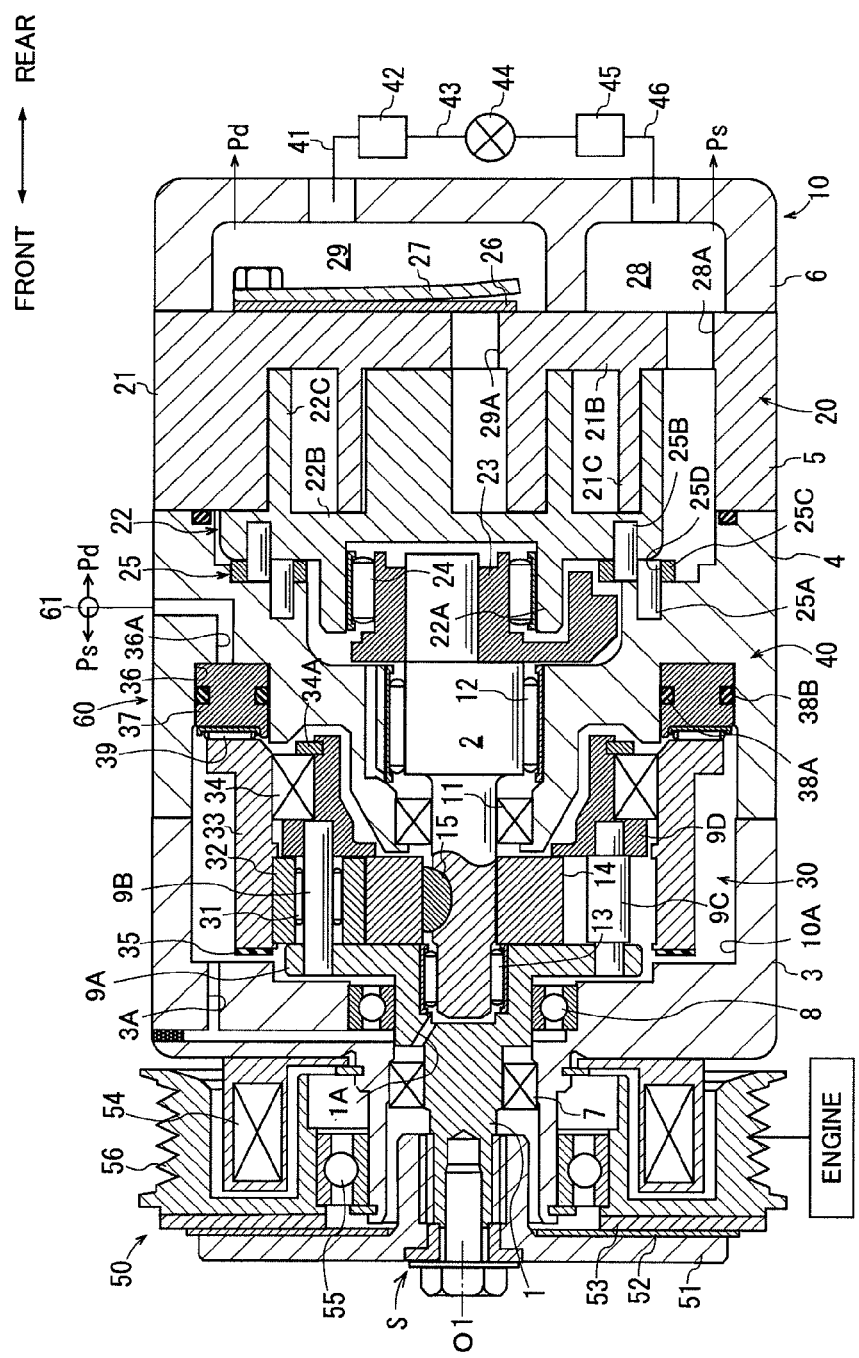
FIG. 1 is a longitudinal sectional view of a compressor with a transmission according to a first embodiment of the present invention.

As shown in FIG. 1, the compressor with the transmission (hereinafter referred to as compressor) according to the first embodiment includes a scroll-type compression mechanism 20, a transmission 30 and a control device 40 which are assembled together and is mounted on a vehicle as a part of an air conditioner. In each of the longitudinal views, the left-hand side and the right-hand side of the drawings correspond to the front and the rear of the compressor, respectively.

The compressor includes a housing 10 including a first housing 3, a second housing 4, a third housing 5 and a fourth housing 6 which are connected together in this order. Rear end surface of the first housing 3 and front end surface of the second housing 4 are connected thereby to form therein a transmission chamber 10A which is filled with traction oil. The first housing 3 has formed therethrough a passage 3A through which traction oil is introduced from outer peripheral region of the transmission chamber 10A to the center thereof.

The third housing 5 has a fixed scroll 21 integrally formed therewith. The second housing 4 and the third housing 5 cooperate to house therein a movable scroll 22. The fixed scroll 21 and the movable scroll 22 will be described later. The third housing 5 and the fourth housing 6 are connected each other thereby to form therebetween a suction chamber 28 and a discharge chamber 29.

The input shaft 1 is rotatable on the axis O1 thereof and supported by a boss of the first housing 3 through a seal member 7 and a bearing 8. The bearing 8 is pressed into the first housing 3 with a clearance formed between the bearing 8 and the input shaft 1. A key 15 is provided between the output shaft 2 and a sun roller 14 that forms a part of the transmission 30. The provision of the clearance and the key 15 allows the assembly S including the input shaft 1, a carrier 9, a radial bearing 31, a plurality of planetary rollers 32, the sun roller 14, a ring roller 33, a friction layer 35, a circlip 34A and a one-way clutch 34 to move relative to the first housing 3 as a unit in the direction that is parallel to the axis O1.

Rear end of the input shaft 1 extends rearward in the transmission chamber 10A and the input shaft 1 is formed integrally with a carrier body 9A in the form of a disc located adjacently to the rear end of the input shaft 1 and extending radially outward from the input shaft 1 in facing relation to the inner surface of the first housing 3 so as to have a clearance between the carrier body 9A and the inner surface of the first housing 3. The carrier body 9A forms a part of the transmission 30 as will be described later.

The output shaft 2 is rotatable on the axis O1 and supported by a boss of the second housing 4 through a seal member 11 and a radial bearing 12. Front end of the output shaft 2 is located within the carrier body 9A and a radial bearing 13 is provided between the carrier body 9A and the output shaft 2. A passage 1A is formed in the input shaft 1 for communicating with the passage 3A formed in the first housing 3 and supplying traction oil to the radial bearing 13. The sun roller 14 is mounted on the output shaft 2 at a position rearward of the carrier body 9A. The aforementioned key 15 is provided between the output shaft 2 and the sun roller 14 so that the sun roller 14 rotates with the output shaft 2 and also that the sun roller 14 moves relative to the output shaft 2 in the direction parallel to the axis O1. The sun roller 14 also forms a part of the transmission 30. Rear end of the output shaft 2 extends toward the movable scroll 22.

The following will describe the compression mechanism 20. A drive bush 23 integrally formed with a balancer and the movable scroll 22 are housed between the second housing 4 and the third housing 5.

The drive bush 23 that is eccentrically fixed to the rear end of the output shaft 2 can rotate integrally with the output shaft 2. A radial bearing 24 is provided on outer peripheral surface of the drive bush 23.

The movable scroll 22 includes a boss 22A that is rotatably supported by the drive bush 23 through the radial bearing 24, a disc-shaped movable end plate 22B formed integrally with the boss 22A and extending radially and a movable scroll wall 22C extending rearward from the movable end plate 22B in the direction parallel to the axis O1.

Three or more fixed pins 25A of the rotation preventing device 25 are fixed to the rear surface of the second housing 4 in the direction parallel to the axis O1. Additionally, the same number of movable pins 25B as that of the fixed pins 25A are fixed to the movable end plate 22B of the movable scroll 22 in the direction parallel to the axis O1. Furthermore, the same number of movable rings 25C as that of the fixed pins 25A and the movable pins 25B are provided between the second housing 4 and the movable end plate 22B. The movable ring 25C has formed therethrough a hole 25D receiving therein a pair of the fixed pin 25A and the movable pin 25B with the axes thereof spaced away at a distance corresponding to the orbital radius of the movable scroll 22. The fixed pin 25A, the movable pin 25B and the movable ring 25C cooperate to form the aforementioned rotation preventing device 25 for preventing the movable scroll 22 from rotating on its axis.

As mentioned earlier, the fixed scroll 21 is integrally formed with the third housing 5. The fixed scroll 21 includes a disc-shaped fixed end plate 21B extending radially outward and a fixed scroll wall 21C extending frontward from the fixed end plate 21B in the direction parallel to the axis O1.

The fixed scroll wall 21C of the fixed scroll 21 and the movable scroll wall 22C of the movable scroll 22 have the same length as measured in the direction parallel to the axis O1. The distal ends of the fixed scroll wall 21C of the fixed scroll 21 and the movable scroll wall 22C of the movable scroll 22 are slidable on the movable end plate 22B and the fixed end plate 21B, respectively.

The fixed end plate 21B has formed therethrough at the center thereof a discharge port 29A that is communicable with a discharge chamber 29. A discharge valve 26 and a retainer 27 are fixed to the fixed end plate 21B in the discharge chamber 29 so as to close the discharge port 29A. The fixed end plate 21B has formed therethrough in the outer peripheral portion thereof a suction port 28A communicating with a suction chamber 28.

The above second, third and fourth housings 4, 5, 6, the output shaft 2, the drive bush 23, the movable scroll 22, the rotation preventing device 25 and the fixed scroll 21 cooperate to form the scroll-type compression mechanism 20.

The discharge chamber 29 is connected to a condenser 42 by a tube 41, the condenser 42 is connected to an evaporator 45 through an expansion valve 44 by a tube 43 and the evaporator 45 is connected to the suction chamber 28 by a tube 46. A discharge-pressure supply passage (or channel Pd-Pd shown in FIG. 1) is provided for supplying a discharge pressure Pd in the discharge chamber 29 to an electromagnetic valve 61. Similarly, a suction-pressure supply passage (or channel Ps-Ps shown in FIG. 1) is provided for supplying a suction pressure Ps in the suction chamber 28 to the electromagnetic valve 61. Though not shown in the drawing, a passage is provided in the second and the third housings 4, 5 for holding the pressure in the transmission chamber 10A at a level of the suction pressure Ps by connecting the suction chamber 28 and the transmission chamber 10A.

Figure 2:
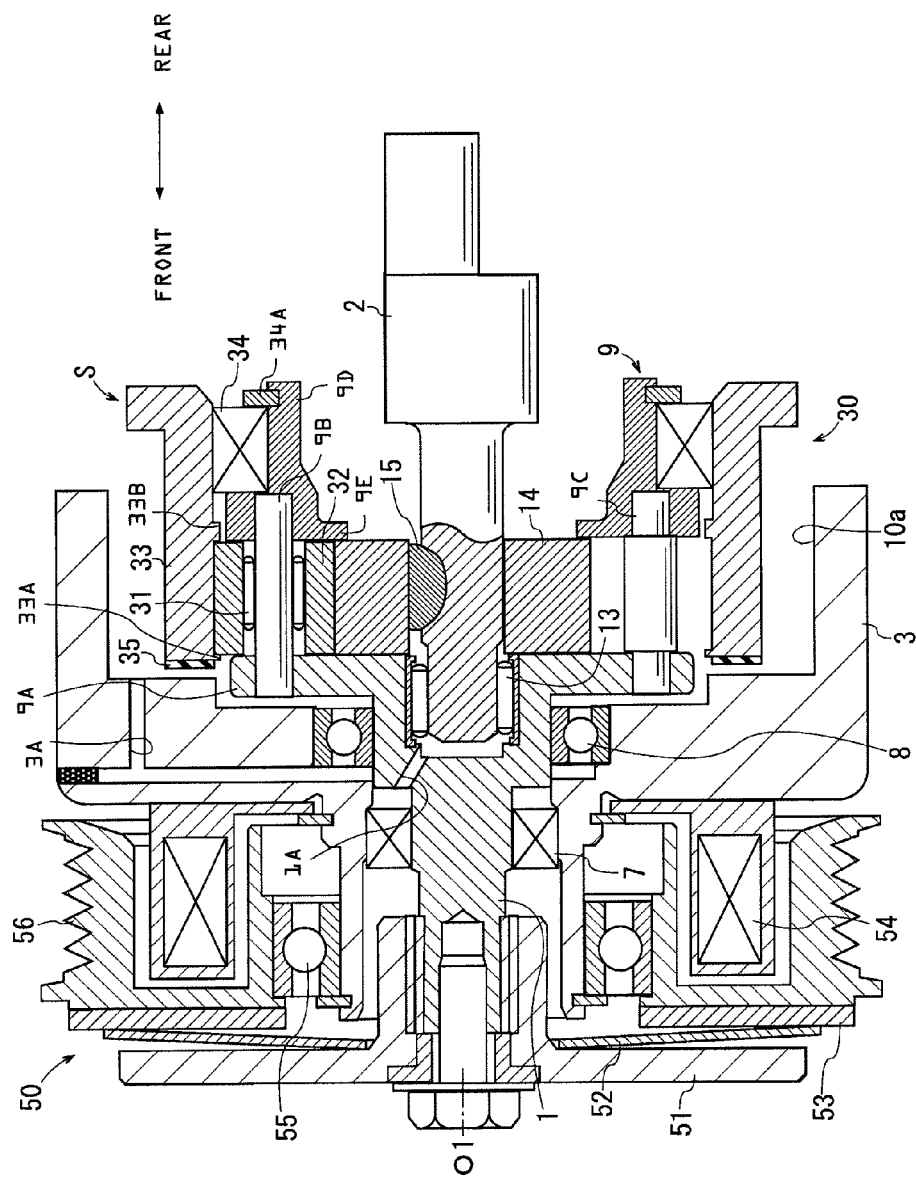
FIG. 2 is a fragmentary partially enlarged longitudinal sectional view of the compressor with the transmission of FIG. 1.
Figure 3:
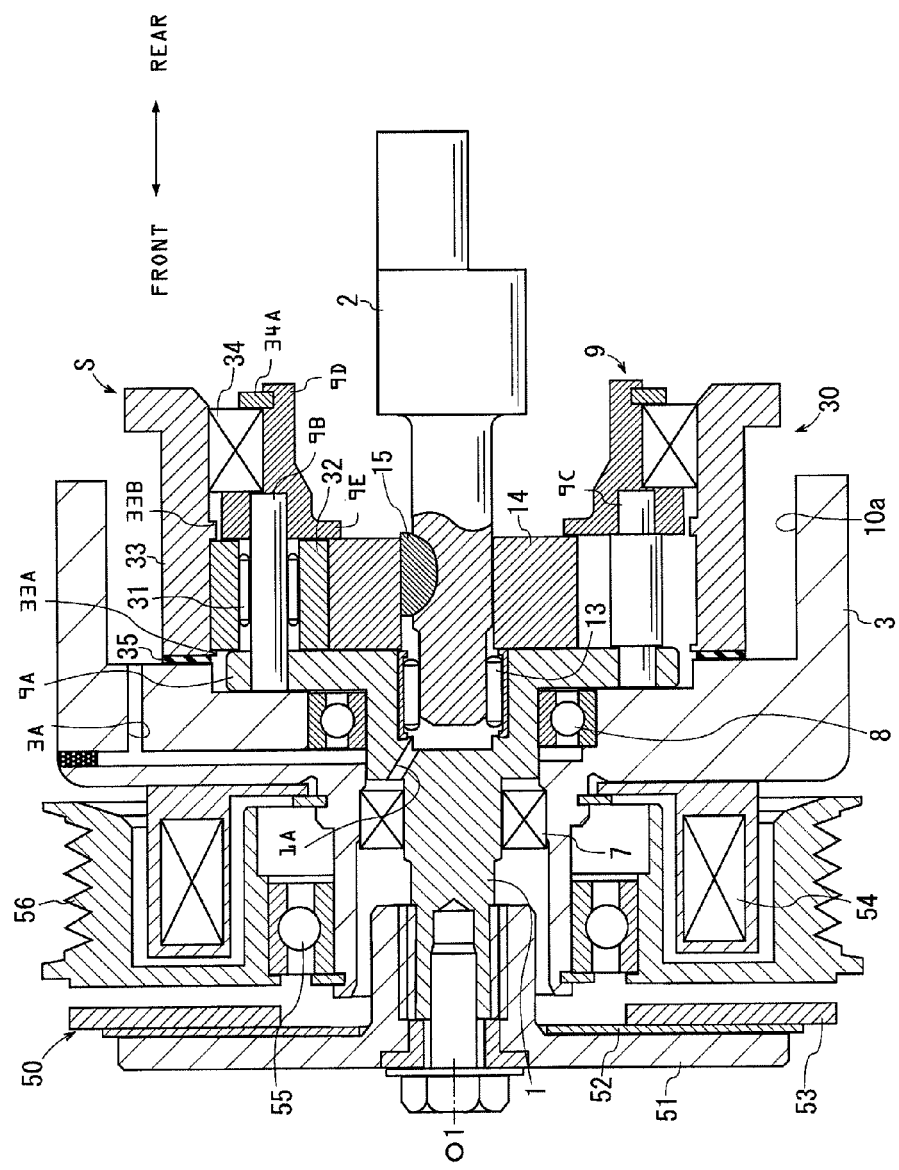
FIG. 3 is another fragmentary partially enlarged longitudinal sectional view of the compressor with the transmission of FIG. 1.

The following will describe the transmission 30. As shown in FIGS. 2 and 3, in the transmission chamber 10A, three first supporting shafts 9B and three second supporting shafts 9C (only one first supporting shaft 9B and one second supporting shaft 9C being shown in the drawings) extend rearward from positions on an imaginary circle centered on the axis O1 on the rear surface of the carrier body 9A that are adjacent to the outer periphery of the carrier body 9A in parallel relation to the axis O1. The first supporting shafts 9B and the second supporting shafts 9C are arranged in alternative manner. Each first supporting shaft 9B is cylindrically-shaped and each second supporting shaft 9C is also cylindrically-shaped, but has stepped portions. The planetary roller 32 is rotatably supported by the first supporting shaft 9B through the radial bearing 31. The outer surface of each planetary roller 32 engages with the outer surface of the sun roller 14 with interference therebetween. The outer surfaces of the planetary roller 32 and the sun roller 14 are coated for preventing slip therebetween.

A rear carrier 9D is fixed to the rear ends of the respective first and the second supporting shafts 9B, 9C. The rear carrier 9D is substantially cylindrically-shaped, extending rearward. The rear carrier 9D has formed on the inner side thereof a flange 9E contactable with the rear surface of the sun roller 14. The carrier body 9A, the respective first supporting shaft 9B, the respective second supporting shafts 9C and the rear carrier 9D cooperate to rotatably support three planetary rollers 32 and to form the carrier 9 that is integrally rotatable with the input shaft 1. The carrier body 9A and the rear carrier 9D correspond to the sun roller position restricting device of the present invention.

The ring roller 33 is provided between the respective planetary rollers 32 and the first and the second housings 3, 4. The ring roller 33 is in interference contact at the inner peripheral surface of the front end portion thereof with the outer peripheral surface of the respective planetary rollers 32. The inner peripheral surface of the ring roller 33 in contact with the outer peripheral surface of the respective planetary rollers 32 is coated for preventing a slip between the ring roller 33 and the respective planetary rollers 32. The ring roller 33 is formed on the inner surface thereof with flanges 33A, 33B contactable with the front and rear end surfaces of the respective planetary rollers 32, respectively. The carrier body 9A, the rear carrier 9D and the flanges 33A, 33B correspond to the planetary roller position restricting device of the present invention.

As shown in FIG. 1, the sun roller 14, the respective planetary rollers 32, the ring roller 33 and the carrier 9 cooperate to form the transmission 30 that is a planetary roller train.

The one-way clutch 34 is fixed to the outer surface of the rear carrier 9D by the circlip 34A. The one-way clutch 34 is in contact at the outer surface thereof with the inner surface of the ring roller 33 of the rear end portion of the ring roller 33. The one-way clutch 34, which is of a type that is generally available on the market, allows the ring roller 33 to rotate only in one direction relative to the carrier 9 and prevents it from rotating in the opposite direction. In the first embodiment, the input shaft 1 and the carrier 9 are rotatable around the axis O1 in clockwise direction as vied from the front of the compressor. The one-way clutch 34 is also configured so as to allow the ring roller 33 to rotate relative to the carrier 9 in counter-clockwise direction as vied from the front of the compressor, but to prevent the rotation in clockwise direction.

The friction layer 35 is provided on front surface of the ring roller 33 in facing relation to the rear surface of the first housing 3. The friction layer 35 is made of an annular flat plate having a low slide property. The friction layer 35 is brought into contact with the rear surface of the first housing 3 by the frontward movement of the ring roller 33.

A control chamber 36 is formed in the front surface of the second housing 4 in the shape of an annular recess in facing relation to the rear surface of the ring roller 33. An annular control piston 37 is accommodated in the control chamber 36 so as to slide in longitudinal direction of the compressor (or in the direction of the axis O1). O-rings 38A, 38B made of rubber are provided in the inner and outer peripheral surfaces of the control piston 37 for sealing between the control piston 37 and the control chamber 36.

The electromagnetic valve 61 as a pressure adjusting device is connected to the control chamber 36 through a passage 36A. The electromagnetic valve 61 is operable to connect the control chamber 36 selectively to the discharge-pressure supply passage (channel Pd-Pd shown in FIG. 1) or to the suction-pressure supply passage (channel Ps-Ps shown in FIG. 1). As previously described, the pressure in the transmission chamber 10A facing the control piston 37 is maintained at the suction pressure Ps. A thrust bearing 39 is located at the front of the control piston 37.

The friction layer 35, the control chamber 36, the control piston 37, the passage 36A, the thrust bearing 39 and the electromagnetic valve 61 cooperate to form a clutch 60 that fixes the ring roller 33 to the first housing 3 or allows the ring roller 33 to rotate relative to the first housing 3. The clutch 60, the one-way clutch 34, the electromagnetic valve 61 and the passage 36A cooperate to form the control device 40.

An electromagnetic clutch 50 is connected to the front end of the input shaft 1. The electromagnetic clutch 50 includes a hub 51 that is fixed to the front end of the input shaft 1 for rotating with the input shaft 1, an armature 53 connected to the hub 51 through a leaf spring 52 as an elastic member and a coil 54 fixed to the front surface of the first housing 3. A pulley 56 is rotatably supported by a boss of the first housing 3 through a radial bearing 55. The pulley 56 is coupled to an engine as an external drive source through a belt. The coil 54 is provided inside the pulley 56.

When the coil 54 of the electromagnetic clutch 50 is energized, the armature 53 is attracted to the pulley 56 against elastic force of the leaf spring 52 and the input shaft 1 is integrally rotated with the pulley 56, so that the torque of the engine is transmitted to the input shaft 1. The rotation of the input shaft 1 around the axis O1 is transmitted at the same or increased speed to the output shaft 2.

When the output shaft 2 is driven to rotate, the drive bush 23 whose axis is eccentric to the axis of the output shaft 2 is rotated and the movable scroll 22 makes an orbital motion while being prevented from rotating around its axis by the rotation preventing device 25 in the compression mechanism 20. With the orbital motion of the movable scroll 22, a compression chamber that is formed between the fixed scroll 21 and the movable scroll 22 is progressively reduced in volume from outer side of the compression mechanism 20 to the center thereof. Thus, refrigerant drawn into the compression chamber from the suction chamber 28 is compressed and discharged into the discharge chamber 29. Refrigerant in the discharge chamber 29 is delivered to the condenser 42 and air-conditioning for a compartment of the vehicle is accomplished by allowing the refrigerant to be evaporated by the evaporator 45.

When the coil 54 of the electromagnetic clutch 50 is energized, the armature 53 is attracted to the pulley 56 against the elastic force of the leaf spring 52 as shown in FIG. 2, so that the input shaft 1 rotates integrally with the pulley 56, thus a torque being transmitted to the input shaft 1. On the other hand, when the coil 54 of the electromagnetic clutch 50 is deenergized, the armature 53 is returned away from the pulley 56 by the elastic force of the leaf spring 52 as shown in FIG. 3, so that the input shaft 1 is disconnected from the pulley 56 and torque is transmitted no longer to the input shaft 1.

When the discharge-pressure Pd is applied to the control chamber 36 with the electromagnetic clutch 50 engaged and hence torque transmitted to the input shaft 1, the control piston 37 moves the assembly S frontward through the ring roller 33. In this case, though the sun roller 14 and the ring roller 33 engage with the respective planetary rollers 32 in interference contact therewith, the provision of the key 15 and the clearance between the bearing 8 and the input shaft 1 allows the entire assembly S to move frontward relative to the first housing 3 in the direction parallel to the axis O1. The planetary rollers 32 which are engaged with the ring roller 33 are moved easily by way of the flanges 33A, 33B of the ring roller 33 in the same direction as the ring roller 33. The flange 33B also prevents the planetary rollers 32 from moving rearward relative to ring roller 33.

The ring roller 33 is pressed securely against the first housing 3 due to high friction between the friction layer 35 and the first housing 3.

Then, the one-way clutch 34 allows the ring roller 33 to rotate relative to the carrier 9 only in one direction (i.e. in counter-clockwise direction as viewed from the front of the compressor). In accordance with the rotation of the input shaft 1 and the carrier 9, the respective planetary rollers 32 that orbit around the axis O1 in clockwise direction rotate around their corresponding first supporting shafts 9B in counter-clockwise direction due to the interference between the respective planetary rollers 32 and the ring roller 33. As a result, the sun roller 14 engaged with the respective planetary rollers 32 and the output shaft 2 rotatable integrally with the sun roller 14 are rotated at a higher speed than that of the input shaft 1. Thus, the rotation of the input shaft 1 is transmitted at an increased speed to the output shaft 2.

On the other hand, when the suction-pressure Ps is applied to the control chamber 36, the control piston 37 no longer urges the assembly S frontward through the ring roller 33. Accordingly, the friction force between the friction layer 35 and the first housing 3 no longer works and the ring roller 33 is released from the first housing 3. In this case, the ring roller 33 rolls by the thrust bearing 39.

Since the input shaft 1 is urged axially rearward in the direction parallel to the axis O1 by the reaction force due to the elastic force of the leaf spring 52 of the electromagnetic clutch 50, the ring roller 33 is released from the first housing 3. At this time, due to the key 15 and the clearance between the bearing 8 and the input shaft 1, the assembly S is moved rearward in the direction parallel to the axis O1 with respect to the first housing 3. The planetary rollers 32 are moved easily by way of the flanges 33A, 33B of the ring roller 33 in the same direction as the ring roller 33. The flange 33A prevents the planetary rollers 32 from being displaced relative to the ring roller 33, from being displaced frontward and also prevents the carrier 9 from being displaced frontward with the planetary rollers 32 relative to the ring roller 33. Additionally, the flange 33A prevents physical interference between the carrier 9 and the first housing 3. Since the carrier 9 includes the carrier body 9A and the rear carrier 9D having the flange 9E, the assembly S can move easily in accordance with the movement of the carrier 9 and the carrier 9 can also move easily in accordance with the movement of the planetary rollers 32 and the sun roller 14.

The ring roller 33 is urged to rotate in clockwise direction around the axis O1 in accordance with the rotation of the input shaft 1. Since the respective planetary rollers 32 in contact with the sun roller 14 rotate in the clockwise direction, the ring roller 33 attempts to rotate faster than the input shaft 1 in the clockwise direction. As previously described, the one-way clutch 34 allows the ring roller 33 to rotate only in one direction, but prevents the ring roller 33 from rotating relative to the carrier 9 in the counterclockwise direction as view from the front of the compressor. The thrust bearing 39 assures smooth rotation of the ring roller 33 relative to the control piston 37. Thus, the input shaft 1, the carrier 9, the planetary rollers 32, the sun roller 14, the ring roller 33 and the output shaft 2 rotate integrally, with the result that the output shaft 2 rotates at the same rotating speed as the input shaft 1.

Thus, the compressor that employs the transmission 30 made of the planetary roller train causes less vibration and less noise. Though the compressor can change the rotating speed of the input shaft 1 into two different speeds of the output shaft 2, it can be manufactured at a low cost due to the simplified structure.

Therefore, the compressor according to the present embodiment of the present invention can accomplish the reduction of manufacturing cost and noise development.

Since the sun roller 14 of the compressor according to the present embodiment can move in the direction parallel to the axis O1 relative to the output shaft 2, the output shaft 2 does not need to be moved simultaneously. Therefore, the structure of the compressor is further simplified and the manufacturing cost can be reduced further.

Moreover, since the ring roller 33 is moved away from the first housing 3 by the reaction force due to the elastic force of the leaf spring 52 of the electromagnetic clutch 50, a specific device for moving the ring roller 33 away from the first housing 3 may be dispensed with, so that the structure can be simplified further and the manufacturing cost can be reduced further.

Figure 4:
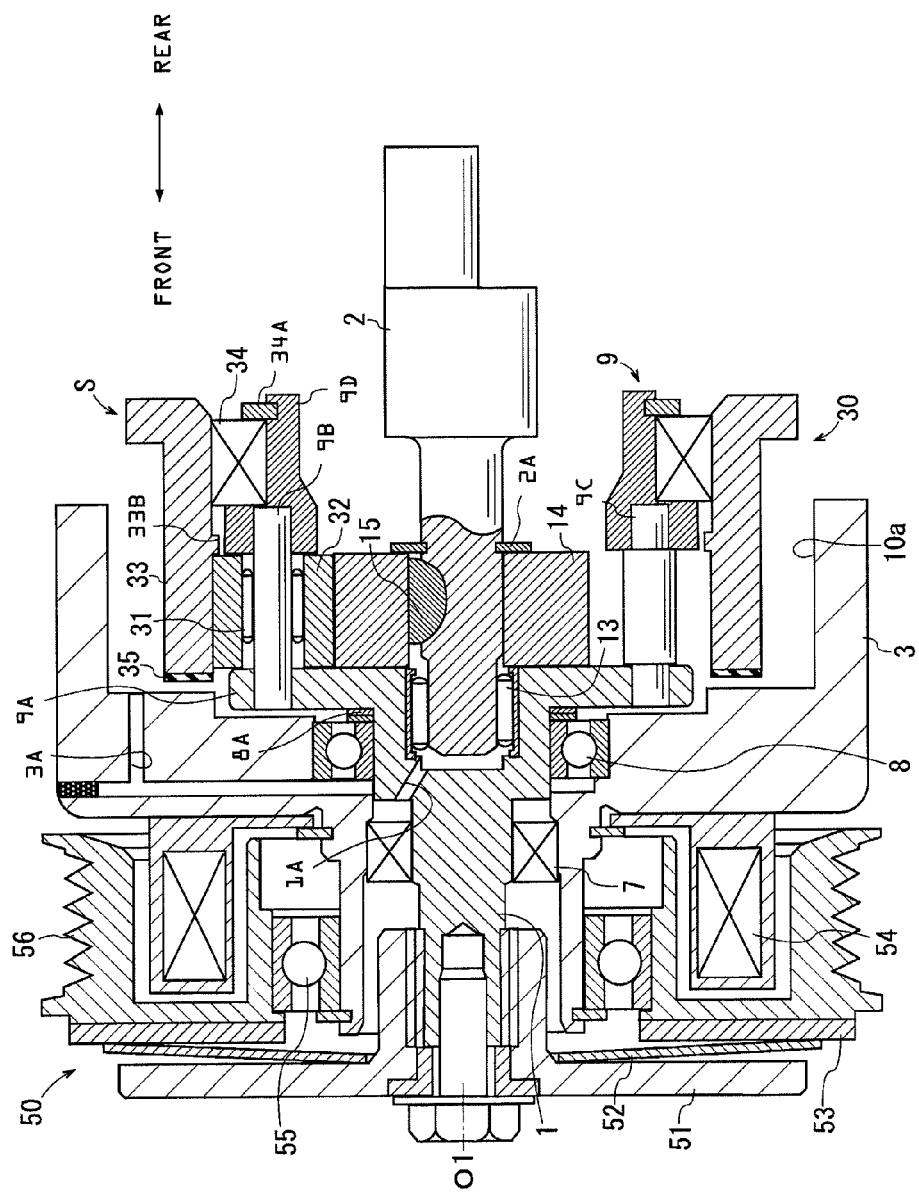
FIG. 4 is a fragmentary partially enlarged longitudinal sectional view of a compressor with a transmission according to a second embodiment of the present invention.

In the second embodiment of the compressor shown in FIG. 4, as in the case of the first embodiment, a clearance is formed between the bearing 8 and the input shaft 1 and the carrier body 9A that is integral with the input shaft 1 extends radially outward behind the bearing 8. Unlike the compressor according to the first embodiment, however, a plurality of shims 8A are provided between the front end surface of the carrier body 9A and the inner ring of the bearing 8 for preventing the input shaft 1 from moving frontward. The shim 8A corresponds to an input shaft position restricting device of the present invention.

The rear carrier 9D of the compressor according to the second embodiment has no flange such as 9E of the first embodiment, but a circlip 2A that corresponds to a rear position restricting device of the present invention is provided on the output shaft 2. The carrier body 9A and the circlip 2A correspond to the sun roller position restricting device of the present invention. In the following description, the same reference numerals will be used for the common elements or components in the first and the second embodiments and the description of such elements or components will be omitted.

In the compressor according to the second embodiment, the assembly S can be also moved rearward easily by the movement of the carrier body 9A. When the output shaft 2 is moved frontward, the sun roller 14 is moved frontward by the circlip 2A thereby to move the carrier body 9A frontward easily. When the carrier body 9A is moved frontward, the shim 8A prevents the interference between the carrier body 9A and the first housing 3. Other advantageous effects are the same as those described with reference to the first embodiment.

Figure 5:
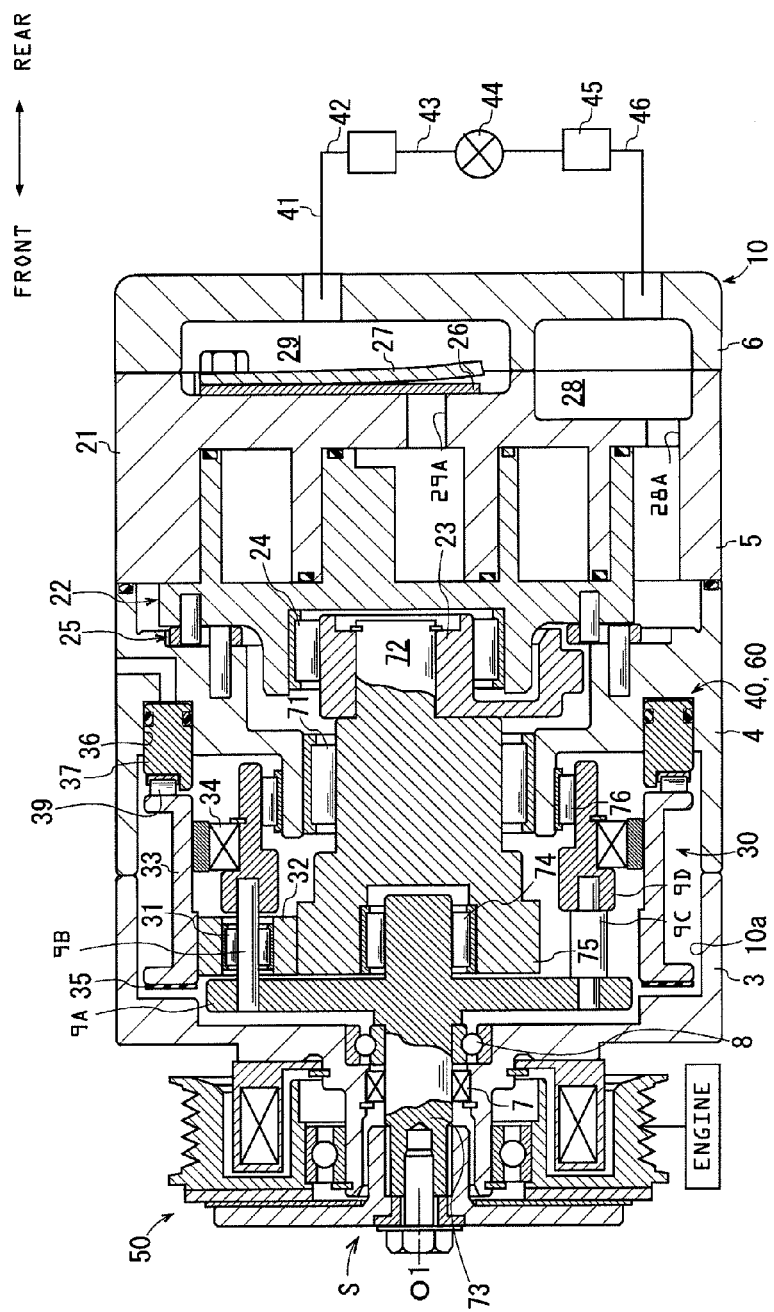
FIG. 5 is a longitudinal sectional view of a compressor with a transmission according to a third embodiment of the present invention.

In the compressor according to the third embodiment shown in FIG. 5, the output shaft 72 is provided via a radial bearing 71 on the inner surface of a boss of the second housing 4 and the rear end of the input shaft 73 is located inside the output shaft 72. A radial bearing 74 is provided between the input shaft 73 and the output shaft 72. The sun roller 75 located rearward of the carrier body 9A is integrally formed with the output shaft 72.

A rear carrier 9D is fixed to each of the first supporting shafts 9B and the second supporting shafts 9C at the rear ends thereof. A radial bearing 76 is provided between the rear carrier 9D and the second housing 4. The carrier body 9A, the first supporting shafts 9B, the second supporting shafts 9C and the rear carrier 9D cooperate to form the carrier 9. In the following description, the same reference numerals will be used for the common elements or components in the first and the third embodiments and the description of such elements or components will be omitted.

The sun roller 75 is integrally formed with the output shaft 72. Therefore, the input shaft 73, the carrier 9, the radial bearing 31, the planetary rollers 32, the sun roller 75, the ring roller 33, the friction layer 35, the circlip 34A, the one-way clutch 34, the output shaft 72 and the drive bush 23 cooperate to form the assembly S. In this case, the output shaft 72 and the drive bush 23 need to move integrally and simultaneously with input shaft 73.

The present invention is not limited to the first through third embodiments and the invention may be practiced in various manners within the scope of the invention.

In the first and the third embodiments, the bearing 8 is pressed into the first housing 3 with a clearance formed between the bearing 8 and the input shaft 1, 73. However, input shaft 1, 73 may be pressed into the bearing 8 with a clearance formed between the first housing 3 and the bearing 8.

The compression mechanism is not limited to a scroll-type mechanism but may employ a general type of compression mechanism such as piston type compression mechanism. The clutch may include a link mechanism composed of a plurality of movable members.

The present invention can be used for a vehicle air conditioner.

What is claimed is:

1. A compressor comprising:
    a housing;
    a compression mechanism formed in the housing and operable to compress refrigerant;
    an input shaft supported by the housing, the input shaft extending into the housing from outside and rotatable on an axis of the input shaft;
    an output shaft supported by the housing, the output shaft extending in the housing and rotatable on the axis of the input shaft for driving the compression mechanism;
    a transmission provided in the housing between the input shaft and the output shaft for transmitting torque from the input shaft to the output shaft and for changing a rotating speed of the input shaft into two different speeds of the output shaft for driving the compression mechanism by one of the same or an increased rotating speed, the transmission including:
        a plurality of planetary rollers;
        a carrier rotatably supporting the respective planetary rollers and integrally rotatable with the input shaft;
        a sun roller engaged with the respective planetary rollers and integrally rotatable with the output shaft, the sun roller being engaged with the respective planetary rollers such that a peripheral surface of the sun roller is in interference contact with a peripheral surface of the respective planetary rollers; and
        a ring roller engaged with the respective planetary rollers, the ring roller being one of fixed to the housing or rotatable relative to the housing, and the ring roller being engaged with the respective planetary rollers such that a peripheral surface of the ring roller is in interference contact with the peripheral surface of the respective planetary rollers; and
    a control device provided between the carrier and the ring roller for controlling the operation of the transmission, the control device including:
        a one-way clutch provided between the ring roller and the carrier and allowing the ring roller to rotate in only one direction relative to the carrier; and
        a clutch provided between the housing and the ring roller,
        wherein the input shaft, the carrier, the respective planetary rollers, the sun roller, and the ring roller cooperate to form an assembly, and
        wherein the assembly moves as a unit relative to the housing in a direction that is parallel to the axis of the input shaft in accordance with the clutch being configured to one of either fix the ring roller to the housing or allow the ring roller to rotate relative to the housing.

2. The compressor according to claim 1, wherein the sun roller moves relative to the output shaft in the direction parallel to the axis of the input shaft.

3. The compressor according to claim 1, further comprising:
    an electromagnetic clutch provided between the housing and the input shaft, wherein the electromagnetic clutch includes an elastic member,
    wherein when the electromagnetic clutch is energized, the electromagnetic clutch connects an external drive source to the input shaft against elastic force of the elastic member and torque is transmitted from the external drive source to the input shaft, and
    wherein when the electromagnetic clutch is deenergized, the electromagnetic clutch disconnects the external drive source from the input shaft by elastic force of the elastic member and torque is no longer transmitted to the input shaft.

4. The compressor according to claim 1, wherein the clutch includes:
    a friction layer that can fix the ring roller to the housing by the movement of the ring roller;
    a control chamber formed in the housing in facing relation to the ring roller;
    a control piston accommodated in the control chamber so as to slide in the direction of the axis of the input shaft;
    a thrust bearing provided between the control piston and the ring roller; and
    a pressure adjusting device supplying a pressure to the control chamber for moving the control piston.

5. The compressor according to claim 1, further comprising:
    a bearing that is provided between the housing and the input shaft rotatably supporting the input shaft relative to the housing,
    wherein a clearance is formed between one of the housing and the bearing or between the bearing and the input shaft.

6. The compressor according to claim 5, wherein the clearance is formed between the bearing and the input shaft, and wherein the compressor further comprises:
    a carrier body that is integral with the input shaft extending radially outward behind the bearing; and
    an input shaft position restricting device provided between a front end surface of the carrier body and an inner ring of the bearing for preventing the input shaft from moving frontward.

7. The compressor according to claim 1, wherein the compressor further comprises:
    a sun roller position restricting device for preventing the sun roller from moving at least one of frontward and rearward.

8. The compressor according to claim 7, wherein the sun roller position restricting device includes:
    a carrier body located frontward of the sun roller; and
    a rear carrier located rearward of the sun roller,
    wherein the carrier body and the rear carrier cooperate to form a part of the carrier.

9. The compressor according to claim 7, wherein the sun roller position restricting device includes:
    a carrier body located frontward of the sun roller; and
    a rear position restricting device provided in the output shaft rearward of the sun roller.

10. The compressor according to claim 1, wherein the compressor further comprises:

a planetary roller position restricting device for preventing the planetary rollers from moving at least one of frontward and rearward.

11. The compressor according to claim 10, wherein the planetary roller position restricting device includes:
a carrier body located frontward of the planetary rollers; and
a rear carrier located rearward of the planetary rollers,
wherein the carrier body and the rear carrier cooperate to form a part of the carrier.

12. The compressor according to claim 10, wherein the planetary roller position restricting device is a flange formed on an inner surface of the ring roller so as to move the planetary rollers with the ring roller.

13. The compressor according to claim 12, wherein the flange is provided rearward of the planetary rollers.

14. The compressor according to claim 12, wherein the flange is provided frontward of the planetary rollers.

* * * * *